(12) United States Patent
Muramatsu et al.

(10) Patent No.: US 6,239,426 B1
(45) Date of Patent: May 29, 2001

(54) SCANNING PROBE AND SCANNING PROBE MICROSCOPE

(75) Inventors: Hiroshi Muramatsu; Katsunori Honma, both of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/348,319

(22) Filed: Jul. 7, 1999

(30) Foreign Application Priority Data

Jul. 8, 1998 (JP) .................................................. 10-193354

(51) Int. Cl.[7] ....................................................... H01J 3/14
(52) U.S. Cl. ....................... 250/234; 250/227.11; 73/105; 356/376
(58) Field of Search ....................... 250/227.11, 234–236, 250/306, 307; 73/104, 105; 374/19

(56) References Cited

U.S. PATENT DOCUMENTS

| | | | |
|---|---|---|---|
| 5,294,790 | * | 3/1994 | Ohta et al. ............................. 250/216 |
| 5,324,935 | * | 6/1994 | Yasutake ................................ 250/234 |
| 5,394,741 | * | 3/1995 | Kajimura et al. ....................... 73/105 |
| 5,559,330 | * | 9/1996 | Murashita .............................. 250/306 |
| 5,969,821 | * | 10/1999 | Muramatsu et al. ................... 356/376 |

* cited by examiner

*Primary Examiner*—Stephone B. Allen
(74) *Attorney, Agent, or Firm*—Adams & Wilks

(57) ABSTRACT

An easy to use scanning probe instrument such as a microscope or memory device is provided with a probe which does not require optical alignment. The scanning probe is a cantilever probe adapted to undergo relative movement with respect to an object such as a sample or a recording media. Optical interference and/or displacement of the cantilever probe caused by interaction with the object while the probe is being scanned across the object is measured to determine characteristics of the object. The cantilever probe has a base member, a cantilever formed in the base member, at least a portion of the cantilever being elastically deflectable to enable the cantilever to be displaced in a given direction. A waveguide extends through the base member and has one end surface disposed proximate the cantilever, the one end surface being positioned perpendicularly with respect to the given direction of displacement of the cantilever and being spaced from the cantilever by a distance sufficient to allow displacement of the cantilever by a desired amount in the given direction.

42 Claims, 5 Drawing Sheets

SCANNING PROBE AND SCANNING PROBE MICROSCOPE

BACKGROUND OF THE INVENTION

This invention relates to a scanning atomic force microscope and scanning proximity field optical microscope for observing microscopic surface geometry or physical information, and to a memory device used to perform data recording and reading out.

Conventionally, in the probe microscope the detection of displacement using the action of a force between a probe and a sample has been an important technology in conducting distance control between the probe and the sample. Among the conventional distance control means are an optical lever method or an optical interference method using light, and further a self-detection type probe using a piezoelectric element is known, and so on.

The conventional optical lever method or optical interference method required a positioning mechanism to align an optical axis with the probe, together with difficultly in optical axis adjustment operation. There has been a problem in that the self-detection type probe using a piezoelectric element was complicated in the probe manufacture process. Furthermore, there has been a demand for a probe having a higher resonant frequency in order to carry out scanning at high speed.

SUMMARY OF THE INVENTION

It is an object of the present invention to provide a scanning probe which does not require optical axis alignment but is easy to use and high in resonant frequency, an atomic force microscope and scanning proximity field optical microscope which is easy to use and capable of high speed scanning, and a memory device which is easy to adjust and capable of high speed reading in.

As a scanning probe easy to use and high in scanning speed, a scanning probe was devised comprising: a cantilever probe; and a waveguide provided in proximity thereto; wherein a base portion of a cantilever or the cantilever itself is elastically deflectable to enable the cantilever to dynamically displace; the waveguide having an end surface positioned perpendicularly to a direction of displacement of the cantilever probe and at a distance not to prevent the displacement of the cantilever; and the cantilever probe and the optical waveguide being integrally formed on a common base member.

Furthermore, a scanning probe microscope was devised which is structured by at least this probe, an optical interference detecting means, a relative moving means between the probe and the sample, and a control and data processing means.

Also, a memory device was devised which is structured by at least this probe, a recording media, an optical interference detecting means, a relative moving means between the probe and the recording media, and a control and data processing means.

DETAILED DESCRIPTION OF THE PREFERRED EMBODIMENTS

Now embodiments of the present invention will be described with reference to the drawings.

Figure 1:
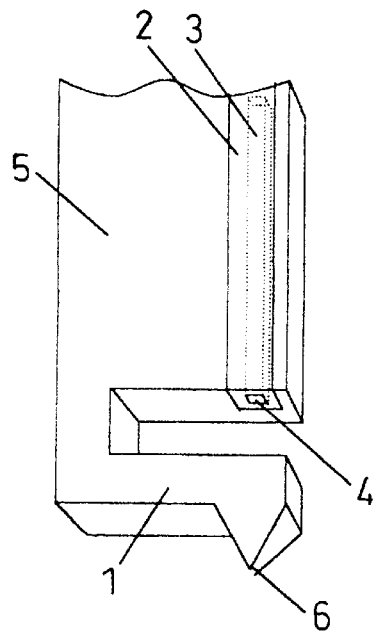
FIG. 1 is view showing a structure of a probe of the present invention.

FIG. 1 shows one example of a scanning probe according to the present invention. In FIG. 1, a probe of the invention has a cantilever probe 1 possessing a spring characteristic and mechanically displaceable, and being an optical waveguide formed by a core 2 and a clad 3. The wave guide has its end face 4 positioned perpendicular with respect to a displacement direction of this cantilever probe 1. Due to this, when light is emitted from the waveguide end face, it is reflected on the cantilever probe 1 and returns again to the waveguide end face 4. Because interference occurs between the return light reflected on the cantilever probe and the return wave reflected on the waveguide end face, it is possible to detect deflection in the cantilever 1 from a change in a return wave signal intensity. Here, where the reflected return wave from the waveguide end face is weak, a reflection function can be separately provided together with an external signal source. Here, where utilizing wave interference using return waves from the waveguide end face, the sensitivity of interference varies at a period of an integral number of times a wavelength for a distance between the waveguide end face and the lever. Accordingly, it is possible to determine a gap distance by previously considering the above or finely adjust the interval by a thermal method.

The gap between this waveguide end face 4 and the cantilever probe 1 is preferably as small as possible. It is however required to be arranged in a positional relationship so as not to obstruct cantilever probe displacement. An important point of the invention lies in the fact that the cantilever probe 1 and the waveguide are integrally formed on a common base member 5. This makes it possible to omit positional adjustment of the waveguide for the cantilever probe in every measurement.

As shown in FIG. 1, the cantilever probe 1 is formed with a sharp tip 6. This tip is placed opposite to a position of the waveguide end face with respect to a direction of cantilever displacement. Thus the tip can function as an atomic force microscopic probe to detect a sample-to-probe acting force as a displacement in a distance direction.

The above scanning probe can be manufactured through a conventional semiconductor lithographic process or thin film forming process.

Figure 2:
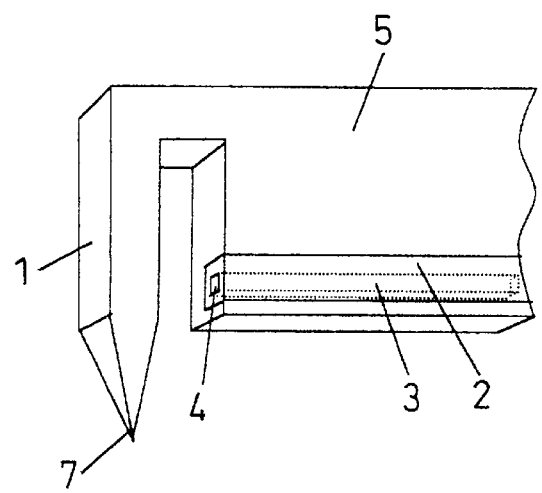
FIG. 2 is a view showing a structure of a probe of the present invention.

On the other hand, it is possible to structure the probe such that a sharp tip 7 is positioned coincident with a lever axis direction as shown in FIG. 2. In this case, it is possible to utilize as a shear-mode probe for the scanning probe microscope.

Figure 3:
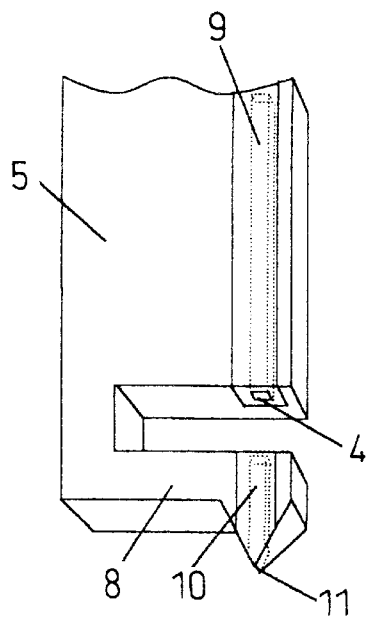
FIG. 3 is a view showing a structure of a probe of the present invention.

In the embodiment shown in FIG. 3, a cantilever probe 8 has therein a waveguide 10 formed to have a wave traveling axis coincident with that of the waveguide 9, whereby the optical waveguide has an end constituting a probe tip 11.

In the above examples, an optical waveguide can generally be used as a waveguide. In such a case, most of the light traveling through the waveguide 9 propagates into the waveguide 10 and exits through the tip 11. Accordingly, this scanning probe can be utilized as a proximity field optical microscopic probe to radiate light through the probe tip onto a sample.

Figure 4:
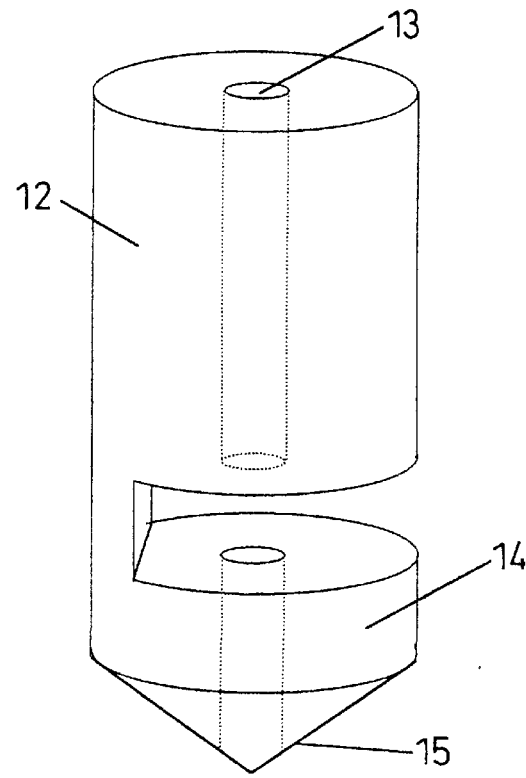
FIG. 4 is a view showing a structure of a probe of the present invention.

An optical fiber can be used as an optical waveguide. FIG. 4 shows an embodiment using an optical fiber as a base material for a scanning probe. In this case, an optical waveguide provided is an optical fiber itself which is formed by a clad 12 and a core 13. In order to form a cantilever probe 14, the optical fiber is partly removed of an intermediate portion slightly distant from its end in an area at least about two-thirds of the diameter. The removal of the optical fiber intermediate portion can be realized by using techniques of a dicing saw, excimer laser, focused ion beam, etc.

In the embodiment of FIG. 4, a core-tipped sharp shape 15 is formed in the cantilever probe portion 14 of the optical fiber, for utilization as a probe for a proximity field optical microscope. This sharp shape can be formed by heating with a heater, burner or carbonic acid gas laser while applying tension at respective ends, or etching using hydrogen fluoride.

The probe for a proximity field optical microscope thus constructed has its lever portion made smaller as compared to the conventional optical-fiber probe utilizing elastic deflection in the fiber axial direction. Accordingly, the resonant frequency can be raised. Due to this, it can cope with a higher scanning rate.

Figure 5:
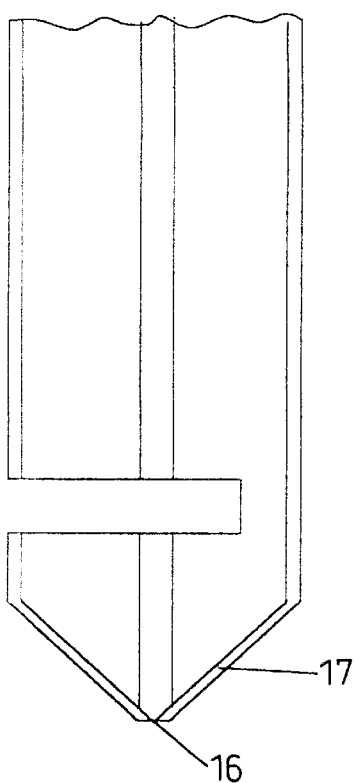
FIG. 5 is a view showing a structure of a probe of the present invention.
Figure 6:
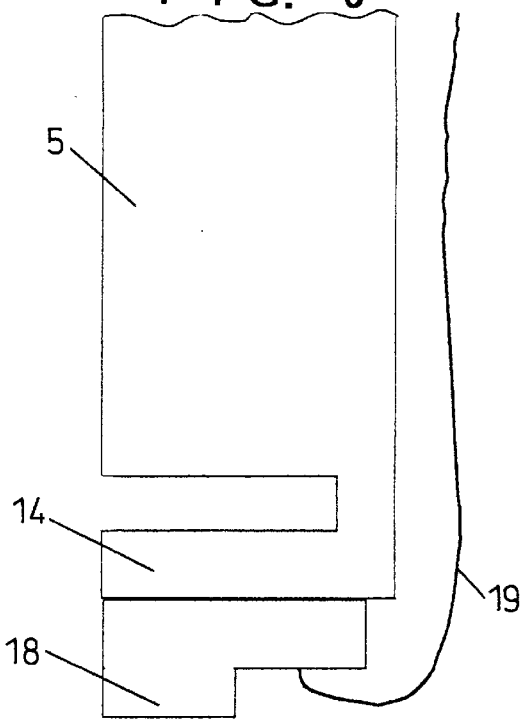
FIG. 6 is a view showing a structure of a probe of the present invention.

In this proximity field optical microscope, the taper portion except for the sharp formed tip 16 is coated with a light shield material 17 as shown in FIG. 5 in order to narrow an area through which light is to be emitted. Specifically, the coating material can be a metal such as aluminum, chromium or gold. Further, a scanning sensor probe can be structured by fixing a sensor device 18 to detect temperature, magnetism, potential, light or the like as shown in FIG. 6 without sharpening the cantilever probe portion of the optical fiber. Here, the signal of the sensor device 18 may be extracted through a lead wire 19 or a patterned wire may be formed on the surface of the probe base member 5.

Now a description is made of a scanning probe microscope using a scanning probe according to the present invention.

Figure 7:
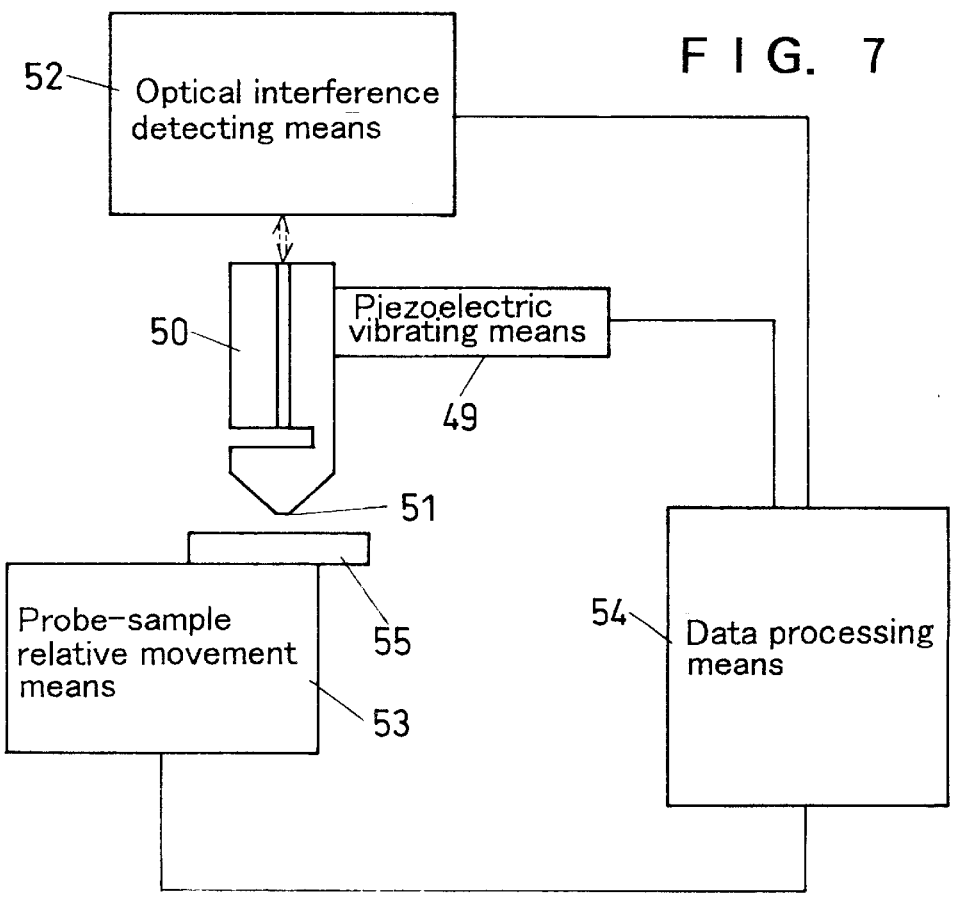
FIG. 7 is a view showing a structure of a scanning probe microscope of the present invention.

FIG. 7 illustrates a structural example of a scanning probe microscope in accordance with the present invention. In FIG. 7, a scanning probe microscope is structured by a scanning probe 50 as shown in FIG. 1, an optical interference detecting means 52, a probe-sample relative movement means 53 and a control and data processing means 54. The scanning probe 50 has an optical waveguide to which light is introduced from the optical interference detecting means 52. The optical interference detecting means 52 also receives light returning from the same optical waveguide so that it can detect a displacement of the probe depending on the variation of optical intensity in interference. The signal detected therein is sent to the control and data processing means 54. The scanning probe 50 has its sharp probe tip positioned in proximity to a sample 55 so that distance control between the probe and the sample as well as two dimensional scanning can be performed by the probe-sample relative movement means 53. This relative movement means 53 is controlled by the control and data processing means 54. The control and data processing means 54 converts a surface geometric signal into image information. Incidentally, where the scanning probe 50 is used with vibration, such probe vibration can be given by a piezoelectric vibrating means 49.

Figure 8A:
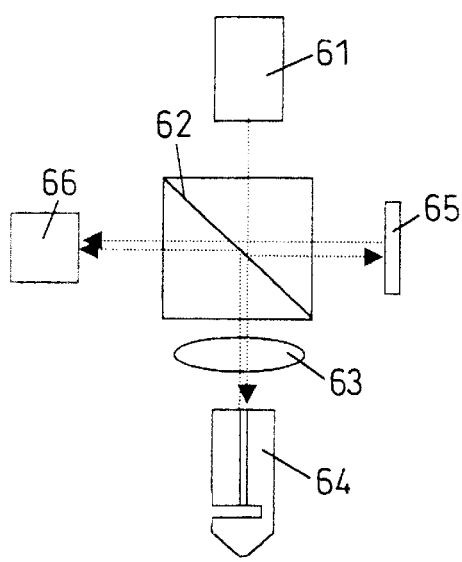
FIGS. 8A and 8B are views showing a structure of an optical interference detecting means used in the scanning probe microscope of the present invention.
Figure 8B:
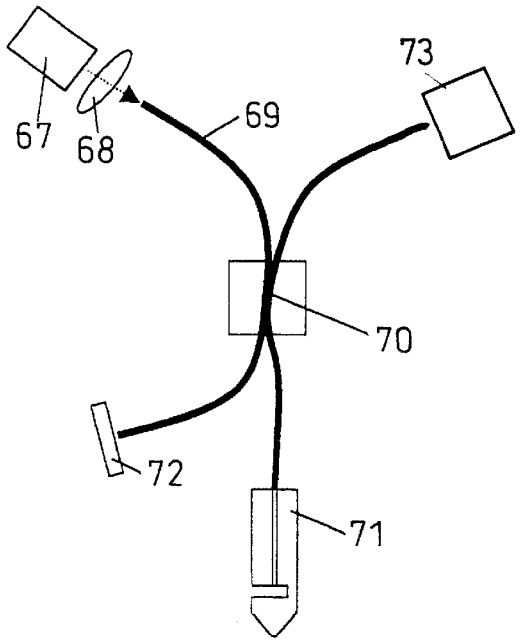

FIGS. 8A and 8B illustrate a structural example of the optical interference detecting means 52. In FIG. 8A, the light emitted from the light source 61 transmits through a beam splitter 62 and goes via a lens 63 into a waveguide of a scanning probe 64. The light on the other hand is perpendicularly changed in direction by the beam splitter 62 to emit onto the mirror 65. The light returning from the scanning probe 64 is perpendicularly changed in direction by the beam splitter 62, reaching a light detector 66, while the light reflected on the mirror 65 transmits through the beam splitter 62 to the light detector 66. There is interference between the light portions reaching the light detector 66. However, the return light from the probe is varied in phase by a displacement of the cantilever probe whereby its optical intensity is varied depending upon a displacement of the cantilever probe.

In FIG. 8B, the light from a light source 67 is introduced through a lens 68 into an optical fiber 69 connected to a 2-to-2 coupler 70. The introduced light travels through the coupler 70 to the scanning probe 71, part of which is branched into another optical fiber having a reflection end 72. The return light from the probe is introduced through the coupler 70 to the light detector 73 while the light reflected on the reflection end 72 also introduced to the light detector 73. Thus interference occurs between these light portions. Also in this case, the return light from the probe is varied in phase by a displacement of the cantilever probe. Accordingly, the optical intensity is varied depending upon a displacement of the cantilever probe.

The sensitivity of detection can be raised by modulating the light from the light source 61 or 67 and performing lock-in detection on the output of the light detector.

Figure 9:
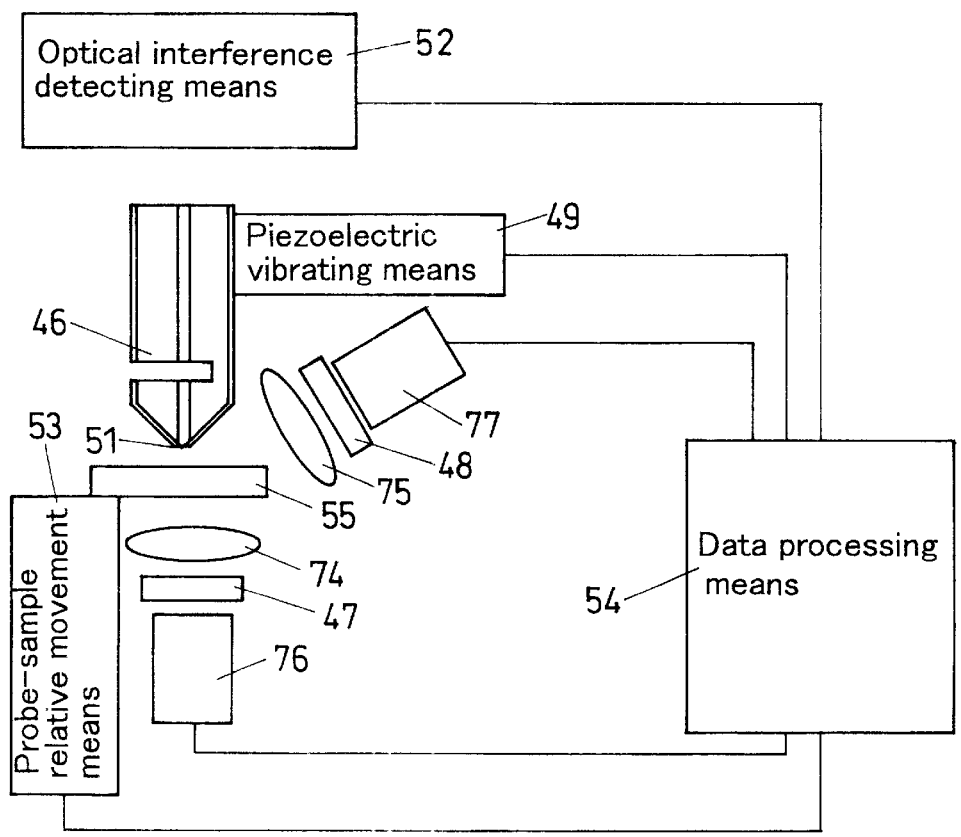
FIG. 9 is a view showing a structure of a scanning proximity field optical microscope of the present invention.

FIG. 9 shows an overall structural view of a scanning proximity field optical microscope using a proximity field optical microscope scanning probe 46 as shown in FIG. 3 or FIG. 4. In FIG. 9, a focusing optical system 74 or 75 and a light detector 76 or 77 are added in addition to the FIGS. 8A and 8B structure. Light is emitted from a probe tip onto a sample 55 where part of the light transmits to be focused by an optical system 74, being detected by a light detector 76. On the other hand, the light reflected on the sample surface is focused by an optical system 75 and detected by a light detector 77. In this case, a light for optical interference can be used as the detection light. However, physical property measurement on the sample can be implemented by preparing different-wavelength light sources for physical property measurement and arranging a filter 47 or 48 in front of the detector.

Figure 10:
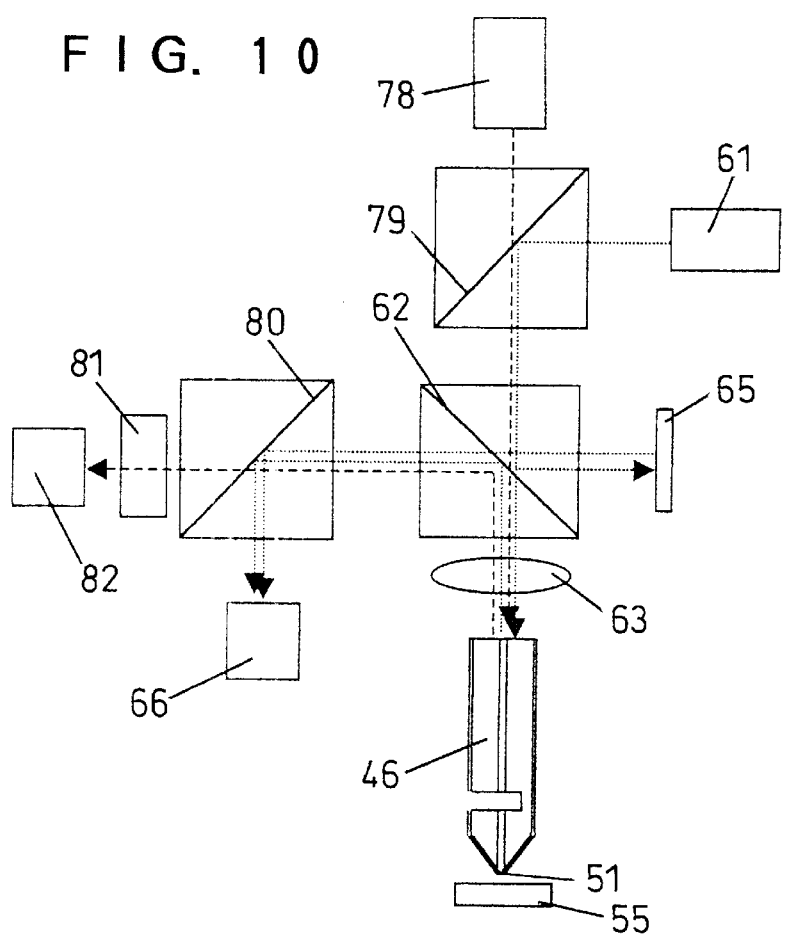
FIG. 10 is a view showing a structure of a scanning proximity field optical microscope of the present invention.

FIG. 10 shows an example of the structure of a so-called illumination collection mode as an application of a scanning proximity field optical microscope. In FIG. 10, added to the structure of FIG. 8A are a dichroic mirror 79 that reflects a light with a wavelength from the light source 61 for probe displacement detection but transmits a light with a wavelength from the light source 78 for sample physical property measurement, a dichroic mirror 80 that reflects the wavelength light from the probe displacement detecting light source 61 but transmits the wavelength light from the sample physical property measuring light source 78, a filter or spectroscope 81 that selects an arbitrary wavelength for physical property measurement, and a photo detector 82. The light path for probe displacement detection is similar to that of the FIG. 8B structure except for passing through the dichroic mirror on the course. The light for probe displacement measurement is emitted from the probe tip 51 onto a surface of a sample 55. The light is converted into fluorescent or Ramman scatter light on a surface of a sample, part of which again returns through the probe tip 51 to the optical waveguide and then passes via the beam splitter 62 and the dichroic mirror 80 to the filter or spectrometer 81 for selecting an arbitrary wavelength for physical measurement, being detected by the light detector 82.

Figure 11:
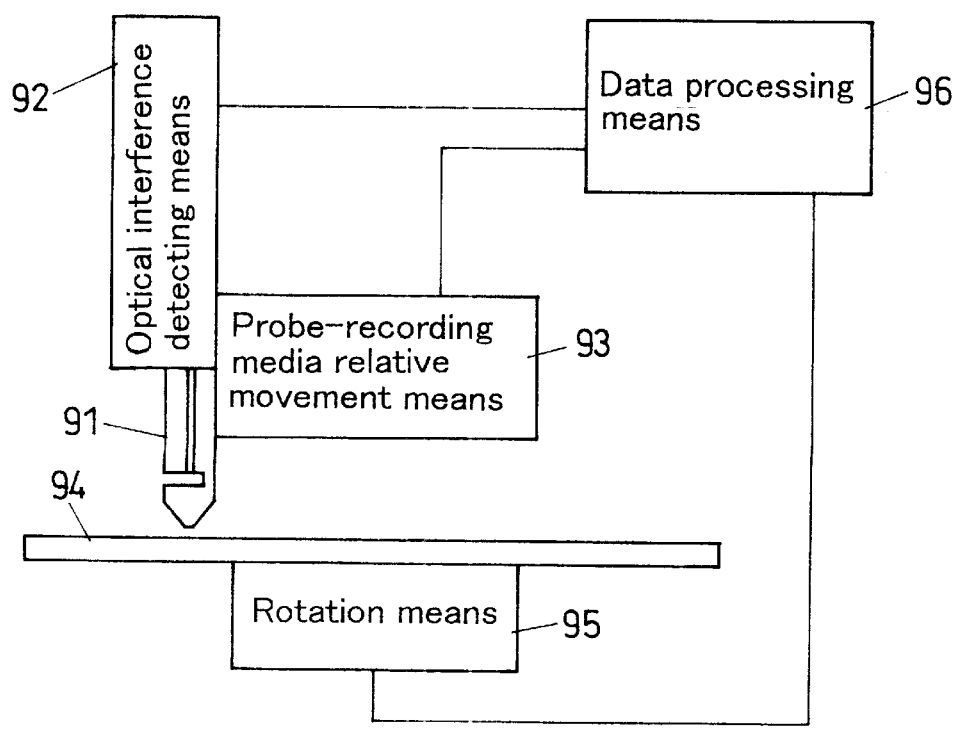
FIG. 11 is a view showing a structure of a memory device of the present invention.

Now an example is shown of the structure of a memory device using a scanning probe as shown in FIG. 1. In FIG. 11, a memory device is structured by a scanning probe 91, an optical interference detecting means 92, a probe-recording media relative movement means 93, a recording media 94, a rotation means 95 and a control and data processing means 96. This scanning probe 91 can read out information recorded in a surface form on the recording media 94.

Figure 12:
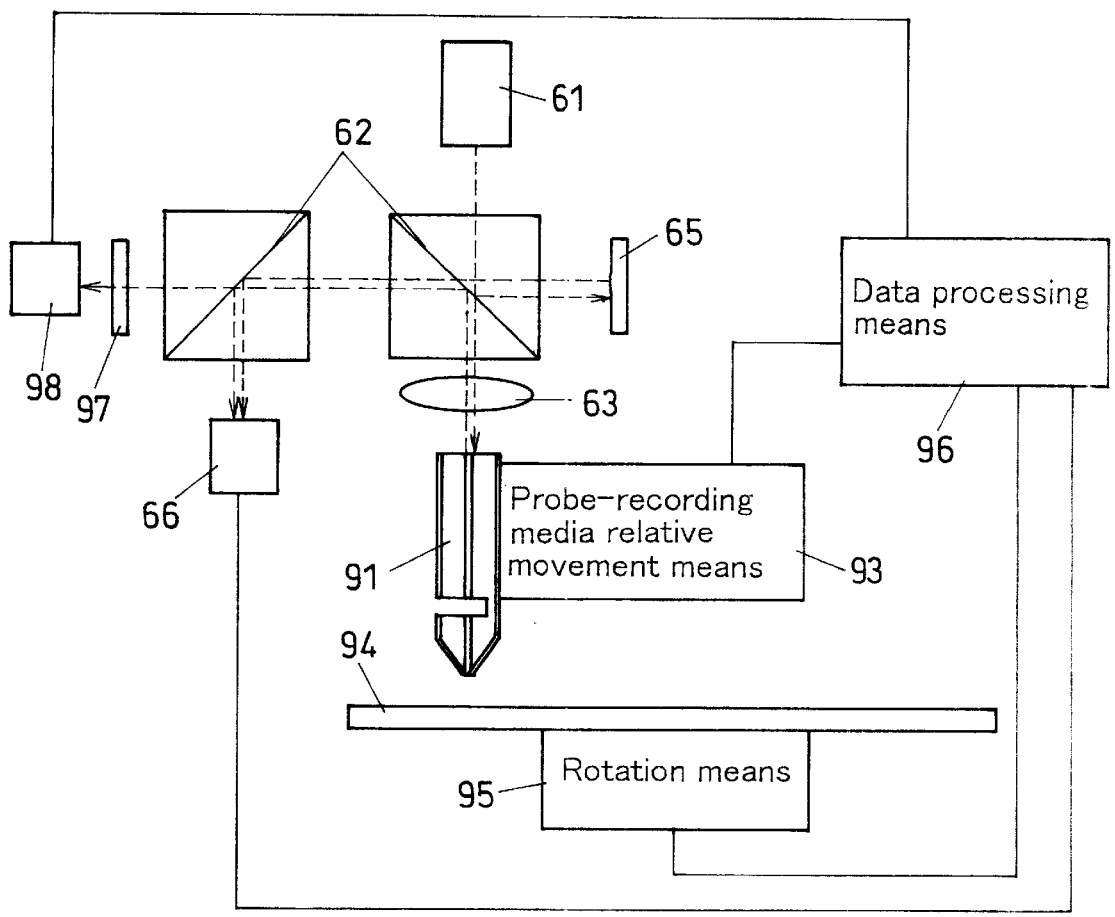
FIG. 12 is a view showing a structure of a memory device of the present invention.

FIG. 12 is a structural example of a optical memory device using a proximity field optical microscope scanning probe as shown in FIG. 3 or FIG. 4. In FIG. 12 there is provided, in place of the optical interference detecting means 92 in FIG. 11, an optical interference detecting means, a polarizing filter 97 for polarization change component detection and a light detector 98 for detecting intensity of the same light, in order to detect a change in polarization characteristic in the media.

Figure 13:
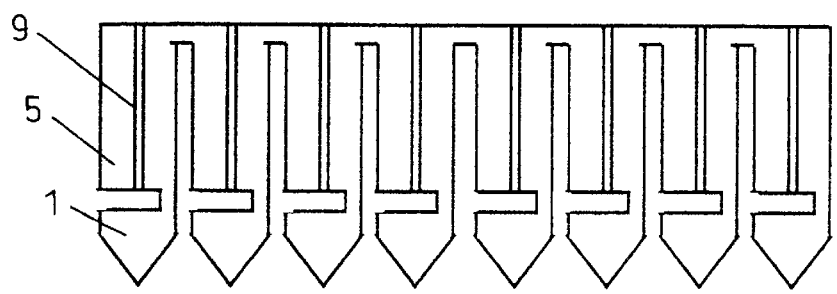
FIG. 13 is a view showing a structure of a probe of the present invention.

The probe used for this memory can be structured by integrating a plurality of scanning probes. FIG. 13 shows a structural example of such a probe section. By incorporating this probe-integrated structure in a memory device, high speed processing is made possible.

According to the present invention, it became possible to provide a scanning probe which does not require optical axis alignment but is easy to use. This makes it possible to provide an atomic force microscope and scanning proximity field optical microscope that are easy to use. Because the probe of the invention is higher in resonant frequency than the conventional probe, a sample surface can be observed through scanning at a higher speed. Moreover, a memory device easy to adjust and able to scan at high speed can be obtained.

What is claimed is:

1. A scanning probe, comprising: a cantilever probe; a waveguide provided proximate the cantilever probe, one of a base portion of the cantilever probe and the cantilever probe itself being elastically deflectable to enable the cantilever probe to be dynamically displaced in a given direction; and a base member on which the cantilever probe and the optical waveguide are integrally formed; wherein the waveguide has an end surface positioned perpendicularly with respect to the direction of displacement of the cantilever probe, the end surface being spaced from the cantilever probe by a distance sufficient to allow displacement of the cantilever probe by a desired amount in the given direction.

2. A scanning probe according to claim 1; wherein the cantilever probe has a sharp tip.

3. A scanning probe according to claim 2; wherein the sharp tip extends in the direction of displacement of the cantilever probe and is positioned on a side of the cantilever probe opposite a side thereof at which the one end surface of the waveguide is positioned.

4. A scanning probe according to claim 3; wherein the waveguide comprises an optical waveguide.

5. A scanning probe according to claim 4; wherein the optical waveguide comprises an optical fiber, and the optical fiber has an intermediate portion from which two-thirds or greater of the material forming the optical fiber is removed in a direction of a diameter of the optical fiber.

6. A scanning probe according to claim 5; wherein the cantilever probe is formed in the optical fiber and has a sharpened end and a core of the optical fiber as a tip.

7. A scanning probe according to claim 6; wherein the cantilever probe has a taper portion terminating in the tip of the probe, the taper portion being coated with a light shielding material in an area except for the tip of the probe.

8. A scanning probe according to claim 2; wherein the sharp tip is provided at a tip of the cantilever probe and extends perpendicularly with respect to the direction of movement of the cantilever probe.

9. A scanning probe according to claim 8; wherein the waveguide comprises an optical waveguide.

10. A scanning probe according to claim 9; wherein the optical waveguide comprises an optical fiber, and the optical fiber has an intermediate portion from which two-thirds or greater of the material forming the optical fiber is removed in a direction of a diameter of the optical fiber.

11. A scanning probe according to claim 10; wherein the cantilever probe is formed in the optical fiber and has a sharpened end and a core of the optical fiber as a tip.

12. A scanning probe according to claim 11; wherein the cantilever probe has a taper portion terminating in the tip of the probe, the taper portion being coated with a light shielding material in an area except for the tip of the probe.

13. A scanning probe according to claim 1; further comprising another waveguide formed in the cantilever probe and having an optical axis coincident with the waveguide, the other waveguide having an end comprising a tip of the cantilever probe.

14. A scanning probe according to claim 13; wherein the cantilever probe has a taper portion terminating in the tip of the probe, the taper portion being coated with a light shielding material in an area except for the tip of the probe.

15. A scanning probe according to claim 13; wherein the waveguide comprises an optical waveguide.

16. A scanning probe according to claim 15; wherein the optical waveguide comprises an optical fiber, and the optical fiber has an intermediate portion from which two-thirds or greater of the material forming the optical fiber is removed in a direction of a diameter of the optical fiber.

17. A scanning probe according to claim 16; wherein the cantilever probe is formed in the optical fiber and has a sharpened end and a core of the optical fiber as a tip.

18. A scanning probe according to claim 17; wherein the cantilever probe has a taper portion terminating in the tip of the probe, the taper portion being coated with a light shielding material in an area except for the tip of the probe.

19. A scanning probe according to claim 1; wherein the base member comprises an optical waveguide material and the cantilever probe and the waveguide are formed in the optical waveguide material.

20. A scanning probe according to claim 19; wherein a portion of the optical waveguide material is removed proximate one end thereof to produce an elastically deflectable portion serving as the cantilever probe.

21. A scanning probe according to claim 20; wherein the removed portion of the optical waveguide material forms a hooked-shaped cantilever probe.

22. A scanning probe microscope comprising: a cantilever probe; an optical waveguide provided proximate the cantilever probe, one of a base portion of the cantilever probe and the cantilever probe itself being elastically deflectable to enable the cantilever probe to be dynamically displaced in a given direction, the waveguide having an end surface positioned perpendicularly with respect to the direction of displacement of the cantilever probe, the end surface being spaced from the cantilever probe by a distance sufficient to allow displacement of the cantilever probe by a desired amount in the given direction; a base member on which the cantilever probe and the optical waveguide are integrally formed; optical interference detecting means for detecting optical interference caused by deflection of the cantilever; relative moving means for causing relative movement between the probe and a sample; and control and data processing means for controlling the relative moving means to cause relative movement between the probe and the sample and determining a characteristic of the sample based on the detected optical interference.

23. A scanning microscope according to claim 22; further comprising an optical microscope comprising a focusing optical system and a photodetector, and another optical waveguide formed on the cantilever probe, the other optical waveguide having an optical axis coincident with the optical axis of the optical waveguide, the other optical waveguide having an end surface comprising a tip of the probe.

24. A memory device comprising: a cantilever probe; an optical waveguide provided proximate the cantilever probe, one of a base portion of the cantilever probe and the cantilever probe itself being elastically deflectable to enable the cantilever probe to be dynamically displaced in a given direction, the waveguide having an end surface positioned perpendicularly with respect to the direction of displacement of the cantilever probe, the end surface being spaced from the cantilever probe by a distance sufficient to allow displacement of the cantilever probe by a desired amount in the given direction; a base member on which the cantilever probe and the optical waveguide are integrally formed; a recording media; optical interference detecting means for detecting optical interference between light projected through the cantilever probe onto the recording media and light reflected by the recording media through the cantilever probe; relative moving means for causing relative movement between the probe and the recording media; and control and data processing means for controlling the relative moving means to cause relative movement between the probe and the recording media and determining a characteristic of the recording media based on the detected optical interference.

25. A memory device according to claim 24; wherein the cantilever probe comprises a plurality of cantilever probes.

26. A memory device according to claim 24; further comprising another optical waveguide formed in the cantilever probe, the other optical waveguide having an optical axis coincident with the optical axis of the optical waveguide and having an end comprising a tip of the probe, a filter and a photodetector for memory information detection.

27. A memory device according to claim 26; wherein the cantilever probe comprises a plurality of cantilever probes.

28. A scanning probe instrument having a cantilever probe, relative moving means for causing relative movement between the cantilever probe and an object, and means for measuring displacement of the cantilever probe caused by interaction with the object while the probe is being scanned across the object, wherein the cantilever probe comprises: a base member; a cantilever formed in the base member, at least a portion of the cantilever being elastically deflectable to enable the cantilever to be displaced in a given direction; and a waveguide extending through the base member and having one end surface disposed proximate the cantilever, the one end surface being positioned perpendicularly with respect to the given direction of displacement of the cantilever and being spaced from the cantilever by a distance sufficient to allow displacement of the cantilever by a desired amount in the given direction.

29. A scanning probe instrument according to claim 28; further comprising another waveguide formed in the cantilever and having an optical axis coincident with the waveguide, the other waveguide having an end comprising a tip of the cantilever.

30. A scanning probe instrument according to claim 28; further comprising optical interference detecting means for detecting optical interference caused by deflection of the cantilever; and control and data processing means for controlling the relative moving means to cause relative movement between the probe and the sample and determining a characteristic of the sample based on the detected optical interference.

31. A scanning probe instrument according to claim 28; further comprising a focusing optical system, a photodetector, and another optical waveguide formed on the cantilever, the other optical waveguide having an optical axis coincident with the optical axis of the optical waveguide and having an end comprising a tip of the cantilever.

32. A scanning probe instrument according to claim 28; wherein the cantilever has a sharp tip.

33. A scanning probe instrument according to claim 32; wherein the sharp tip is provided at a tip of the cantilever and extends perpendicularly with respect to the direction of displacement of the cantilever.

34. A scanning probe instrument according to claim 32; wherein the sharp tip extends in the direction of displacement of the cantilever and is positioned on a side of the cantilever opposite to a side thereof at which the one end surface of the waveguide is positioned.

35. A scanning probe instrument according to claim 28; wherein the waveguide comprises an optical waveguide.

36. A scanning probe instrument according to claim 35; wherein the optical waveguide comprises an optical fiber, and the optical fiber has an intermediate portion from which a portion of the material forming the optical fiber is removed in a direction of a diameter of the optical fiber to form the cantilever.

37. A scanning probe instrument according to claim 36; wherein two-thirds or more of the material forming the optical fiber is removed in the direction of the diameter of the optical fiber to form the cantilever.

38. A scanning probe instrument according to claim 35; wherein the cantilever is formed in the optical fiber and has a sharpened end and a core of the optical fiber as a tip.

39. A scanning probe instrument according to claim 35; wherein the cantilever has a taper portion terminating in the tip of the cantilever, the taper portion being coated with a light shielding material in an area except for the tip of the cantilever.

40. A scanning probe instrument according to claim 28; further comprising a recording media; optical interference detecting means for detecting optical interference between light projected through the waveguide onto the recording media and light reflected by the recording media and projected through the waveguide; and data processing means for determining the value of data stored on the recording media in accordance with the detected optical interference.

41. A scanning probe instrument according to claim 40; further comprising another optical waveguide formed on the cantilever, the other optical waveguide having an optical axis coincident with the optical axis of the optical waveguide and having an end that is a tip of the probe; a filter; and a photodetector for memory information detection.

42. A scanning probe instrument according to claim 40; wherein the cantilever probe comprises a plurality of the cantilever probes.

\* \* \* \* \*